United States Patent
Yokoyama (10) Patent No.: US 11,951,665 B2
(45) Date of Patent: Apr. 9, 2024

(54) CLAMPING APPARATUS OF INJECTION MOLDING MACHINE

(71) Applicant: Sodick Co., Ltd., Kanagawa (JP)

(72) Inventor: Koichi Yokoyama, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 277 days.

(21) Appl. No.: 17/391,022

(22) Filed: Aug. 1, 2021

(65) Prior Publication Data

US 2022/0063165 A1 Mar. 3, 2022

(30) Foreign Application Priority Data

Aug. 27, 2020 (JP) ................................. 2020-143401

(51) Int. Cl.
*B29C 45/66* (2006.01)
(52) U.S. Cl.
CPC ........ *B29C 45/66* (2013.01); *B29C 2045/665* (2013.01)
(58) Field of Classification Search
None
See application file for complete search history.

(56) References Cited

U.S. PATENT DOCUMENTS

| 4,645,443 | A | * | 2/1987 | Aoki | .................. | B29C 45/1751 |
| | | | | | | 425/150 |
| 2004/0037917 | A1 | * | 2/2004 | Teng | ....................... | B29C 45/66 |
| | | | | | | 425/595 |

FOREIGN PATENT DOCUMENTS

| JP | 2951140 | | 9/1999 | | |
| JP | 2951140 | B2 * | 9/1999 | ............. | B29C 45/68 |

* cited by examiner

*Primary Examiner* — Alison L Hindenlang
*Assistant Examiner* — Debjani Roy
(74) *Attorney, Agent, or Firm* — JCIPRNET (57) ABSTRACT

A clamping apparatus of an injection molding machine is provided. A first driving device operates a movable platen to perform mold opening/closing. A second driving device applies a clamping force to the movable platen. A screw mechanism converts rotational power of the driving devices into linear power. By contact/separation between a first rotation plate coupled to a screw shaft and a second rotation plate, a power transmission device switches transmission of power from the second driving device to the screw mechanism. At the normal time, an urging mechanism integrally moves the screw shaft and the first rotation plate in a mold closing direction and releases the connection of the second driving device. When the mold closing is completed, the urging mechanism allows the screw shaft and the first rotation plate to integrally move in a mold opening direction, and brings the second driving device into a connected state.

15 Claims, 6 Drawing Sheets

FIG. 6

CLAMPING APPARATUS OF INJECTION MOLDING MACHINE

CROSS REFERENCE TO RELATED APPLICATIONS

The present application claims priority under 35 U.S.C. § 119 to Japanese Application No. 2020-143401, filed on Aug. 27, 2020. The entire contents of which are hereby incorporated herein by references.

BACKGROUND

Technical Field

The disclosure relates to a clamping apparatus of an injection molding machine.

Particularly, the disclosure relates to a direct-pressure clamping apparatus of an injection molding machine.

Related Art

A mold for injection molding includes a fixed mold and a movable mold and is configured in a way of being openable/closable. Therefore, an injection molding machine is equipped with a clamping apparatus including: a fixed platen which supports the fixed mold; a movable platen which supports the movable mold; and a driving device which drives the movable platen. When molded products are continuously produced, an operation is repeated in which a flowing molding material is injected from an injection nozzle and is supplied into a mold in a state where the mold is closed, and the mold is opened and the molded product is removed after the molding material is solidified. When the molding material is supplied to the mold, simply closing the fixed mold and the movable mold together will cause the mold to be opened due to an internal pressure generated by the molding material inside the mold, and thus a predetermined clamping force which is sufficiently greater than the internal pressure is applied between the fixed mold and the movable mold after the movable mold is brought into contact with the fixed mold. Typically, an operation in which the movable mold is brought into in contact with the fixed mold is referred to as closing the mold or mold closing, an operation in which the movable mold is separated from the fixed mold is referred to as opening the mold or mold opening, and the mold opening and the mold closing are collectively referred to as mold opening/closing. In addition, an operation in which a predetermined clamping force is applied between the fixed mold and the movable mold in a mold closed state is referred to as clamping the mold or clamping.

The clamping apparatus of an injection molding machine is roughly divided into: a toggle clamping apparatus which performs mold opening/closing and clamping via a toggle mechanism, and a direct-pressure clamping apparatus which directly transmits power to a mold to perform mold opening/closing and clamping. Compared with the toggle clamping apparatus, the direct-pressure clamping apparatus has advantages such as excellent straightness of mold movement, the ability to apply a clamping force more uniformly, and the like.

The higher speed the movable mold is moved at, the more the mold opening/closing time can be reduced, and the more the time required for an entire molding cycle can be shortened. However, when the mold is opened/closed by a great force which is required during the clamping, a shock may occur and the clamping apparatus may break down, or the mold may be damaged during the mold closing. Therefore, there is a limit to a speed at which the movable mold is moved. Particularly, from the viewpoint of properties of the driving device, the greater clamping force the driving device can exert, the more difficult it is to operate the driving device at a high speed during the mold opening/closing. Thus, for example, Patent literature 1 discloses a direct-pressure clamping apparatus which can move the movable mold at a higher speed by separately arranging a driving device for performing the mold opening/closing operation and a driving device for performing the clamping operation because a force required for the mold opening/closing operation is as small as one-tenth of the clamping force, thereby further shortening the time required for the entire molding cycle.

[Patent literature 1] Japanese Patent No. 2951140

SUMMARY

In a conventional direct-pressure clamping apparatus including a driving device for mold opening/closing and a driving device for clamping, an electromagnetic brake or a clutch is actively operated, and switching between a mold opening/closing driving portion and a clamping driving portion is performed. Thus, if the time required for switching between the mold opening/closing driving portion and the clamping driving portion can be further reduced in a way of continuously and smoothly transitioning a series of operations from mold closing to clamping and from pressure release to mold opening, the time required for the mold opening/closing and the clamping can be expected to be further shortened.

The disclosure provides a clamping apparatus of an injection molding machine which is a direct-pressure clamping apparatus including a driving device for mold opening/closing and a driving device for clamping, and in which the time required for switching of power between a mold opening/closing driving portion and a clamping driving portion is shortened. Some other advantages of the disclosure are described in each case in the description of embodiments of the disclosure.

In order to solve the above-described problem, the disclosure provides a clamping apparatus of an injection molding machine including: a first driving device, configured to operate a movable platen to which a movable mold is attached and fixed to perform a mold opening/closing; a second driving device, configured to apply a clamping force to the movable platen; a screw mechanism, configured to convert a rotational power of the first driving device or the second driving device into a linear power, so that the movable platen reciprocates along a mold opening/closing direction; a power transmission device, configured to transmit a power of the first driving device to the screw mechanism, and switch a transmission of a power from the second driving device to the screw mechanism by contact/separation between a first rotation plate coupled to a screw shaft of the screw mechanism and a second rotation plate disposed facing the first rotation plate; and an urging mechanism, configured to integrally move the screw shaft and the first rotation plate in a mold closing direction, separate a joining between the first rotation plate and the second rotation plate, and release a connection of the second driving device at a normal time, and which allows the screw shaft and the first rotation plate to integrally move in a mold opening direction due to a mold reaction force generated between a pair of molds, and brings the connection into a connected state when a mold closing is completed.

The clamping apparatus of an injection molding machine of the disclosure is equipped with the screw shaft of the screw mechanism which converts, into the linear power, the rotational power of the first driving device that operates the movable platen to perform the mold opening/closing and the second driving device that applies the clamping force to the movable platen, and is equipped with one rotation plate of a pair of rotation plates of the power transmission device that is coupled to the screw shaft in a way that the screw shaft and the one rotation plate can be made to integrally advance and retreat within a predetermined short distance between a predetermined advance position and a predetermined retreat position. In addition, the urging mechanism is arranged which integrally moves the screw shaft and the rotation plate in the mold closing direction by a predetermined short distance by an urging force weaker than a so-called "mold reaction force" and stops the screw shaft and the rotation plate in the predetermined advance position, wherein the mold reaction force is a force generated when the fixed mold and the movable mold come into contact and makes the movable platen retreat in the mold opening direction along the mold opening/closing direction. Therefore, at the normal time, the screw shaft is in the advance position and the second driving device is not connected to the movable platen through the screw mechanism, but when the mold closing is completed, the screw shaft and the rotation plate integrally move in the mold opening direction by a predetermined short distance and retreat to the predetermined retreat position corresponding to the retreat of the movable platen caused by the mold reaction force, the pair of rotation plates of the power transmission device is joined, and the second driving device is connected to the movable platen through the screw mechanism. As a result, according to the disclosure, because the connection of the driving device for mold opening/closing having a relatively small driving force but a high speed and responsivity is constantly brought into a connected state, and the connection of the driving device for clamping having a relatively great driving force is switched by a relatively simple mechanical operation, the time required for switching of power of the mold opening/closing and the clamping can be further reduced, and furthermore, the time of an entire molding cycle can be shortened.

DESCRIPTION OF THE EMBODIMENTS

Figure 1:
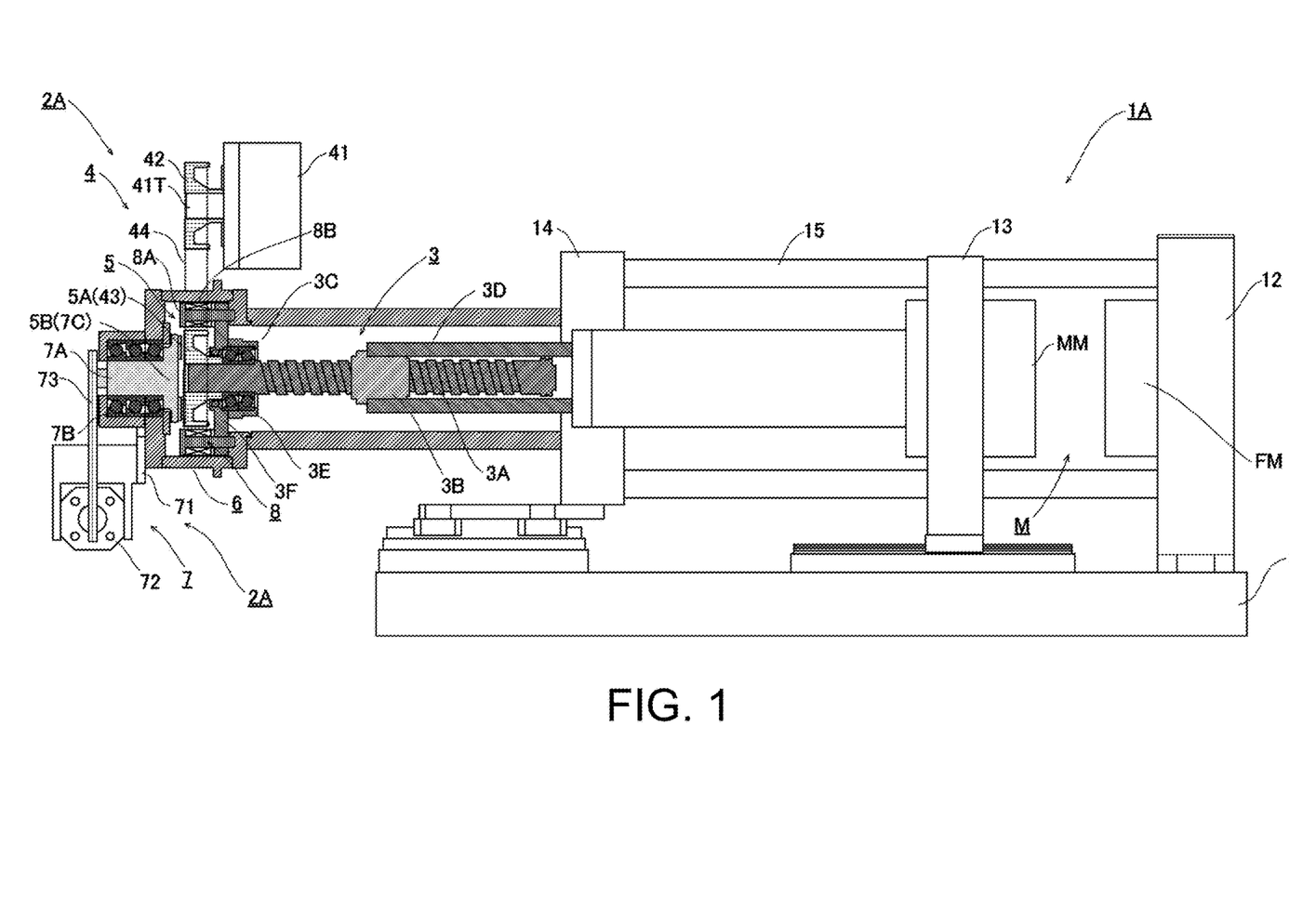
FIG. 1 is a schematic configuration diagram of a clamping apparatus according to a first embodiment.
Figure 6:
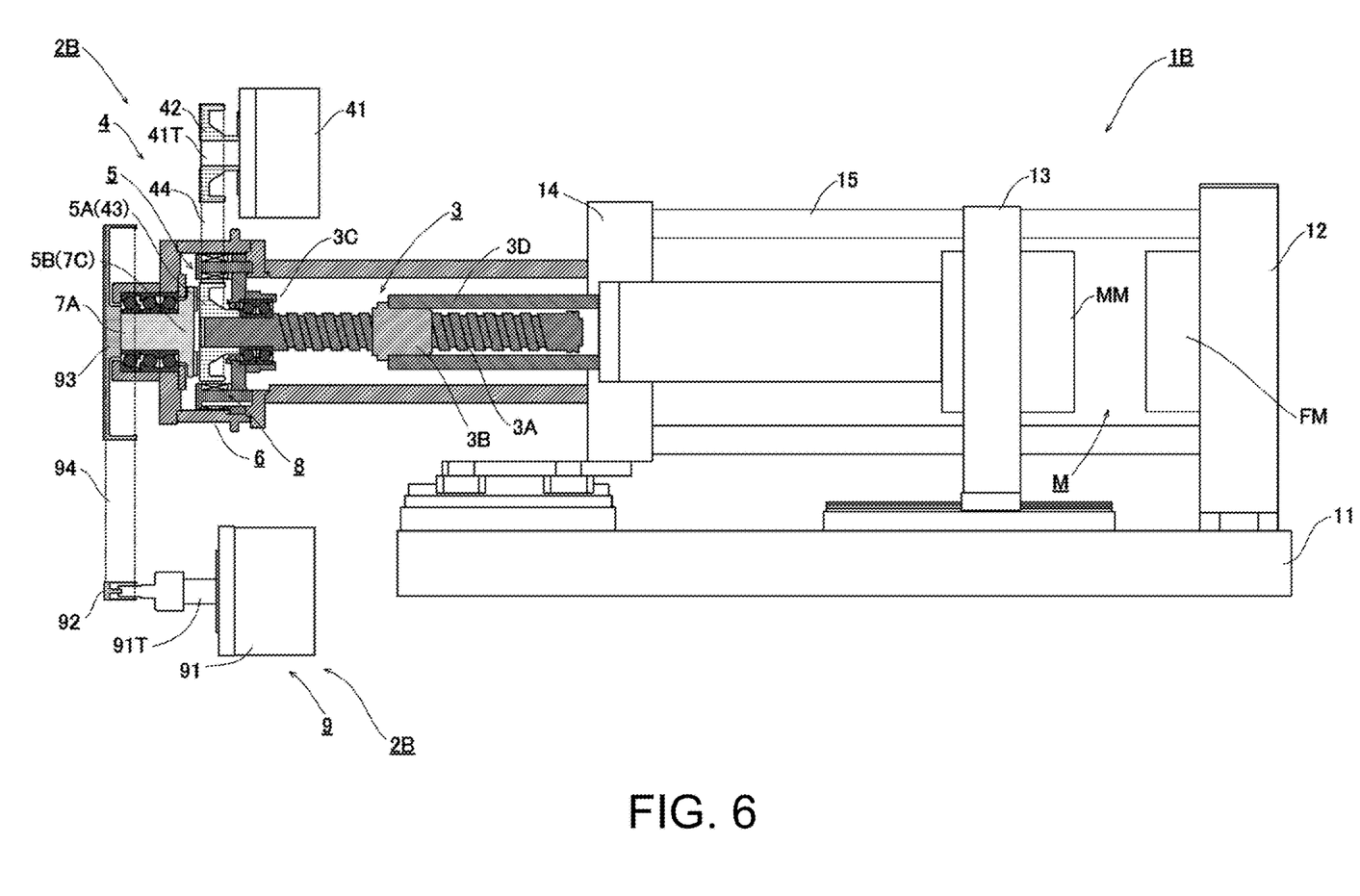
FIG. 6 is a schematic configuration diagram of a clamping apparatus according to a second embodiment.

Hereinafter, embodiments of the disclosure are described with reference to the drawings. Each embodiment described below can be respectively implemented in any combination. In FIG. 1 and FIG. 6, a position in a clamping apparatus where a fixed platen and a movable platen are arranged is taken as a front part of the clamping apparatus, and movement of the movable platen in a mold closing direction toward the fixed platen away from a back platen is referred to as advance movement. In addition, a position in the clamping apparatus where a driving device is arranged is taken as a back part of the clamping apparatus, and movement of the movable platen in a mold opening direction toward the back platen away from the fixed platen is referred to as retreat movement.

An injection molding machine shown in FIG. 1 and FIG. 6 includes: an injection device (not shown) which meters a molding material and injects the molding material to a cavity space of a mold; a clamping apparatus 1A or a clamping apparatus 1B which performs mold opening/closing and clamping of the mold; and a control device (not shown) which controls the injection device and the clamping apparatus 1A or the clamping apparatus 1B. The clamping apparatus 1A and the clamping apparatus 1B are respectively clamping apparatuses of different embodiments and are both direct-pressure clamping apparatuses. The injection molding machine of each embodiment is a horizontal-type injection molding machine, but the clamping apparatus 1A or the clamping apparatus 1B of the claimed disclosure also can be applied to other types of injection molding machines such as a vertical-type injection molding machine and the like.

Firstly, the clamping apparatus 1A according to a first embodiment is described based on FIGS. 1 to 5. As shown in FIG. 1, the clamping apparatus 1A includes: a bed 11, a fixed platen 12, a movable platen 13, a back platen 14, a tie bar 15, and a driving mechanism 2A. The fixed platen 12 and the back platen 14 are erected on the bed 11, and the tie bar 15 is held by the fixed platen 12 and the back platen 14. The movable platen 13 reciprocates between the fixed platen 12 and the back platen 14 by the driving mechanism 2A. A mold M includes a fixed mold FM and a movable mold MM, the fixed mold FM is attached and fixed to the fixed platen 12, and the movable mold MM is attached and fixed to the movable platen 13.

The driving mechanism 2A moves the movable platen 13 to perform mold opening/closing and clamping. In the disclosure, the mold opening refers to an operation in which the movable platen 13 is linearly moved along a mold opening/closing direction to be separated from the fixed platen 12 and the movable mold MM is separated from the fixed mold FM. The mold closing refers to an operation in which the movable platen 13 is linearly moved along the mold opening/closing direction to approach the fixed platen 12 and the movable mold MM is brought into contact with the fixed mold FM. It should be noted that the mold opening and the mold closing are collectively referred to as the mold opening/closing. The clamping refers to an operation in which a predetermined clamping force is applied between the fixed mold FM and the movable mold MM from a mold closed state where the fixed mold FM and the movable mold MM are in contact.

The driving mechanism 2A includes: a ball screw mechanism 3 (a screw mechanism), a first driving device 4, a power transmission device 5, a case 6, a second driving device 7 including a transmission shaft 7A, and an urging mechanism 8. The case 6 accommodates a housing 3E in a way that the housing 3E can reciprocate within a predetermined short distance, wherein the housing 3E stores, in a way of holding, a bearing 3C pivotally supporting a screw shaft 3A of the ball screw mechanism 3 including the screw shaft 3A and a nut 3B.

The ball screw mechanism 3 is mainly configured by the screw shaft 3A and the nut 3B screwed with the screw shaft 3A. The ball screw mechanism 3 in the embodiment includes: the bearing 3C pivotally supporting the screw shaft 3A, and a nut support body 3D supporting the nut 3B. The bearing 3C supports and guides the rotation of the screw shaft 3A around a central axis, and does not allow the movement of the screw shaft 3A by a short distance in a linear single-axis direction (a horizontal single-axis direction) which is the mold opening/closing direction. Specifically, the bearing 3C is a ball bearing and includes: an outer ring, an inner ring, a holder, and a plurality of balls. Particularly, in the bearing 3C of the embodiment, a flange 3F is arranged integrally with the housing 3E.

A first rotation plate 5A of a pair of rotation plates of the power transmission device 5 is fixed to one end of the screw shaft 3A on the mold opening direction side (hereinafter referred to as a mold opening direction back-end), and the bearing 3C has a configuration in which the movement of the screw shaft 3A by a short distance along the mold opening/closing direction is not allowed. Thus, when the housing 3E reciprocates within a short distance between a predetermined advance position and a predetermined retreat position which are previously determined in design, together with the bearing 3C, the screw shaft 3A and the first rotation plate 5A integrally reciprocate by the same distance in the same direction as the housing 3E.

The nut support body 3D is a long body along the mold opening/closing direction with a basic shape of a flat plate, a rod, or a column, and can be made into a truss structure or a honeycomb structure by combining appropriate reinforcing members. As shown in FIG. 1, the nut support body 3D in the embodiment that is practical has a configuration in which at least a part on the mold opening direction back-end side is formed in a circular columnar shape that is hollow and columnar (cylindrical), the nut 3B is coaxially accommodated and fixed inside the hollow, and a part of the screw shaft 3A on the mold closing direction front-end side is inserted into the hollow from an opening at the mold opening direction back-end while the screw shaft 3A is screwed into the nut 3B.

The nut support body 3D is firmly fixed to an opposite surface (a back surface) of the movable platen 13 to an attachment surface (a front surface) of the movable mold MM at a mold closing direction front-end, and the nut support body 3D is arranged by so-called cantilever supporting. The nut 3B is attached and fixed to a position which is superior in design between a center and the mold opening direction back-end of the nut support body 3D. Particularly, in the ball screw mechanism 3 in the embodiment shown in FIG. 1, the nut 3B is arranged at the opening of the mold opening direction back-end of the nut support body 3D. Thus, the screw shaft 3A is linked to the movable platen 13 via the nut 3B and the nut support body 3D.

At the normal time, the urging mechanism 8 is a part for integrally moving the screw shaft 3A and the first rotation plate 5A which is the movable one of the pair of rotation plates of the power transmission device 5 in the mold closing direction along the mold opening/closing direction, separating the joining between the first rotation plate 5A and a second rotation plate 5B which is fixed and is disposed facing the first rotation plate 5A, and releasing the connection of the second driving device 7 to the movable platen 13 with the screw shaft 3A interposed therebetween. Besides, when the mold closing is completed, the urging mechanism 8 is a part for allowing the screw shaft 3A and the first rotation plate 5A to integrally move in the mold opening direction along the mold opening/closing direction due to a so-called "mold reaction force" which is a force in the mold closing direction generated between a pair of molds, and bringing the connection of the second driving device 7 to the movable platen 13 with the screw shaft 3A interposed therebetween into a connected state.

Figure 2:
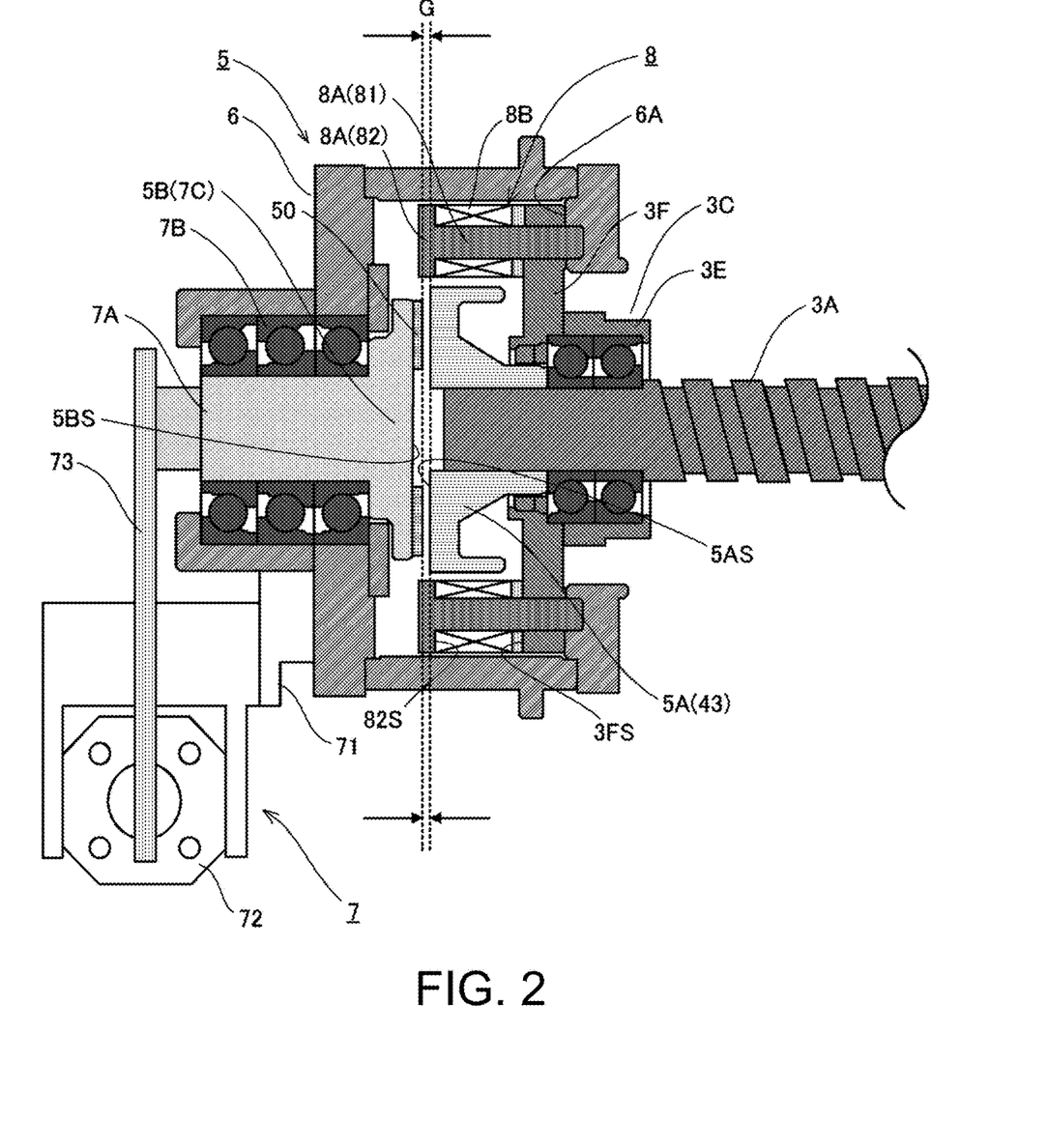
FIG. 2 is an enlarged cross-sectional view around a power transmission device and a transmission shaft according to the first embodiment when a screw shaft is in an advance position.
Figure 3:
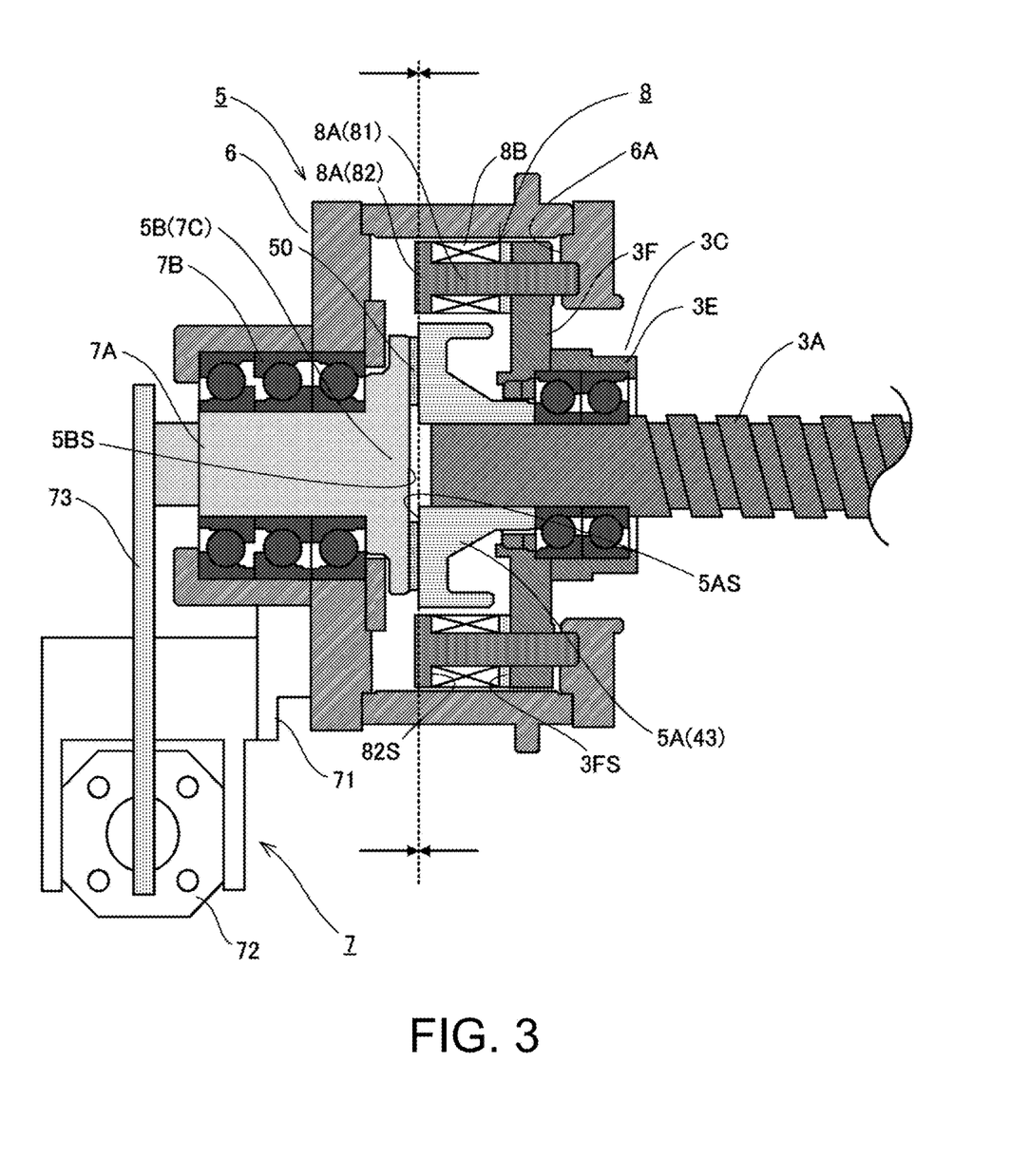
FIG. 3 is an enlarged cross-sectional view around the power transmission device and the transmission shaft according to the first embodiment when the screw shaft is in a retreat position.

More specifically, as shown in FIG. 2 and FIG. 3, the urging mechanism 8 in the embodiment includes at least one fastener 8A and at least one elastic body 8B. The fastener 8A of the urging mechanism 8 in the embodiment is a part for attaching the elastic body 8B to be stretchable along the mold opening/closing direction; and is a part for attaching the housing 3E that stores the bearing 3C of the ball screw mechanism 3 to the case 6 in a way that the housing 3E can reciprocate by a predetermined distance along the mold opening/closing direction.

In a state in which the bearing 3C held and stored by the housing 3E pivotally supports the screw shaft 3A in a way of not allowing the movement of the screw shaft 3A in the mold opening/closing direction, the urging mechanism 8 urges the housing 3E to be pressed against an inner wall 6A of the case 6 by a restoring force of the elastic body 8B. Therefore, at the normal time when the mold reaction force is not generated, the urging mechanism 8 integrally moves the screw shaft 3A and the first rotation plate 5A to the predetermined advance position in the mold closing direction.

When a plurality of the elastic bodies 8B are arranged, an urging force of the urging mechanism 8 is the sum of the restoring forces of the plurality of elastic bodies 8B, but it is desirable that by setting each restoring force of the plurality of elastic bodies 8B to be the same and evenly distributing and disposing each of the elastic bodies 8B around the housing 3E, the urging force in the mold closing direction applied by the plurality of elastic bodies 8B to the housing 3E is made uniform. Particularly, the fastener 8A of the urging mechanism 8 in the embodiment is, for example, a bolt. The fastener 8A which is a bolt mainly has: a shaft portion 81 fixed to the case 6, and a head portion 82 which is formed at one end of the shaft portion 81 with a diameter greater than that of the shaft portion 81.

The shaft portion 81 of the fastener 8A penetrates the flange 3F integrally arranged with the housing 3E of the bearing 3C, and is fastened to the case 6 in a state in which the flange 3F can move freely in the mold opening/closing direction. The elastic body 8B is, for example, a compression spring (a compression coil spring). When the fastener 8A is a bolt and the elastic body 8B is a compression spring, the elastic body 8B is arranged between a head portion seat surface 82S of the fastener 8A and a surface (a back surface) 3FS of the flange in a clamping direction in a way of stretching and contracting along an axial line direction parallel to an axial direction of the screw shaft 3A, in other words, along the mold opening/closing direction, in a state where the shaft portion 81 of the fastener 8A penetrates the inside of a hollow of a coil part of the elastic body 8B and the coil part surrounds the shaft portion 81. In short, the elastic body 8B which is a compression spring pushes the screw shaft 3A to the advance position via the housing 3E integrated with the flange 3F.

At the normal time when the compression spring serving as the elastic body 8B is in a state of stretching by a predetermined length, as shown in FIG. 2, by the urging force of the urging mechanism 8 generated from the restoring force of the elastic body 8B, the flange 3F is pressed against the inner wall 6A of the case 6 and is located in the predetermined advance position together with the bearing 3C which is held and stored by the housing 3E integrated with the flange 3F. Therefore, the screw shaft 3A of the ball screw mechanism 3 and the first rotation plate 5A of the power transmission device 5 move by a predetermined short distance in the mold closing direction along the mold opening/closing direction, and a small gap G is formed between the first rotation plate 5A and the second rotation plate 5B. Thus, at the normal time other than when the mold is closed, the joining between the first rotation plate 5A and the second rotation plate 5B of the power transmission device 5 is separated, and the connection of the second driving device 7 to the screw shaft 3A which is linked to the reciprocating movable platen 13 is released.

Upon completion of the mold closing, when the mold reaction force which is generated between the molds by the contact between the fixed mold FM and the movable mold MM of a pair of the molds M exceeds the urging force of the urging mechanism 8 generated from the restoring force of the plurality of elastic bodies 8B, the movable platen 13 which retreats in the mold opening direction due to the mold reaction force pushes back the screw shaft 3A in the mold opening direction through the nut 3B. The housing 3E, which holds the bearing 3C pivotally supporting the screw shaft 3A without allowing the movement of the screw shaft 3A in the mold opening/closing direction, moves in the mold opening direction as the screw shaft 3A is pushed back in the mold opening direction.

At this time, because the mold reaction force exceeds the urging force of the urging mechanism 8, the flange 3F compresses the elastic body 8B, the elastic body 8B contracts and the flange 3F is separated from the inner wall 6A, and the housing 3E moves together with the screw shaft 3A and the first rotation plate 5A in the mold opening direction by a predetermined short distance. As a result, the first rotation plate 5A of the power transmission device 5 comes into contact with the second rotation plate 5B and the two rotation plates are joined, and the power transmission device 5 brings the connection of the second driving device 7 to the screw shaft 3A which is linked to the movable platen 13 into a connected state.

Thus, at the normal time, the elastic body 8B of the urging mechanism 8 in the first embodiment shown in FIGS. 1 to 3 generates an urging force of the urging mechanism 8 for moving the housing 3E by a predetermined distance in the mold closing direction together with the screw shaft 3A of the ball screw mechanism 3 including the bearing 3C and the first rotation plate 5A (a second pulley 43) of the power transmission device 5, and creating the required small gap G. Besides, when the mold opening is completed, an urging force is generated that is sufficiently smaller than the mold reaction force which allows the housing 3E storing the bearing 3C to move together with the screw shaft 3A and the first rotation plate 5A by a predetermined distance in the mold opening direction, and by which the required small gap G is eliminated and the first rotation plate 5A and the second rotation plate 5B are joined. This elastic body 8B can be, in addition to the compression spring, an object that expands and contracts along the mold opening/closing direction such as a tensile spring (a tensile coil spring), natural rubber, or silicone rubber in an installable range if this object generates a similar urging force.

The first driving device 4 is a part for operating the movable platen 13 to which the movable mold MM is attached and fixed to perform the mold opening/closing. The first driving device 4 has high-speed performance and high responsivity, and can rotate the screw shaft 3A around the central axis to move the movable platen 13 and perform the mold opening/closing in a relatively short time during molding. Specifically, as shown in FIG. 1, the first driving device 4 has: a motor for mold opening/closing 41, a first pulley 42, the second pulley 43, and a rotation transmission component 44. The motor for mold opening/closing 41 in the embodiment is a rotary type servo motor, but an actuator other than the servo motor can be applied in a range in which positioning control can be performed and the required high-speed performance and high responsivity are satisfied.

A driving shaft 41T of the motor for mold opening/closing 41 is directly linked to a rotation shaft of the first pulley 42, and the screw shaft 3A of the ball screw mechanism 3 is linked to the second pulley 43. Specifically, the rotation transmission component 44 is a timing belt and is wound around the first pulley 42 and the second pulley 43. The rotation transmission component 44 basically rotates the second pulley 43 at the same rotation speed as the first pulley 42, and rotational power of the motor for mold opening/closing 41 is directly transmitted to the screw shaft 3A via the rotation transmission component 44. As a result, the nut 3B advances or retreats corresponding to a rotation direction of the screw shaft 3A, and the movable platen 13 moves at a required speed. Moreover, in addition to the timing belt, for example, a mechanism formed by a plurality of gears can be applied as the rotation transmission component 44.

The transmission shaft 7A is pivotally supported by one or more bearings 7B directly fixed to the case 6, and is arranged to be rotatable around a center. In the transmission shaft 7A, the second rotation plate 5B of the pair of rotation plates of the power transmission device 5 is formed at a mold closing direction front-end part 7C. In other words, the mold closing direction front-end part 7C of the power transmission device 5 also serves as the second rotation plate 5B. One end surface of the transmission shaft 7A facing the direction of the screw shaft 3A, in short, the mold closing direction front-end surface (a joining surface 5BS) is disposed facing one surface (a joining surface 5AS) of the second pulley 43 of the first driving device 4 facing the transmission shaft 7A, wherein the second pulley 43 corresponds to the first rotation plate 5A of the power transmission device 5 which is fixed to a mold opening direction back-end of the screw shaft 3A. Upon completion of the mold closing, when the movable platen 13 retreats due to the mold reaction force and the screw shaft 3A moves by a predetermined short distance in the mold opening direction, the joining surface 5BS of the transmission shaft 7A is joined to the joining surface 5AS of the second pulley 43.

In the embodiment shown in FIG. 2 and FIG. 3, a configuration is used in which the second pulley 43 corresponds to the first rotation plate 5A and the second pulley 43 also serves as the first rotation plate 5A, but the first rotation plate 5A can be arranged separately from the second pulley 43. In addition, for example, a mold opening direction back-end surface of the screw shaft 3A of the ball screw mechanism 3 can be taken as the joining surface 5AS, and a mold opening direction back-end part of the screw shaft 3A can also serve as the first rotation plate 5A. A mold closing direction back-end surface which is the other end surface of the transmission shaft 7A is connected to the second driving device 7.

As shown in FIG. 2, at the normal time, when the screw shaft 3A of the ball screw mechanism 3 is in the predetermined advance position in a state of moving by a predetermined distance in the mold closing direction integrally with the second pulley 43 corresponding to the first rotation plate 5A of the power transmission device 5, the joining surface 5AS of the second pulley 43 faces the joining surface 5BS at the mold closing direction front-end part 7C of the transmission shaft 7A corresponding to the second rotation plate 5B of the power transmission device 5, with the predetermined small gap G between the joining surface 5AS and the joining surface 5BS. At this time, the transmission shaft 7A and the screw shaft 3A are separated, and the connection between the second driving device 7 and the movable platen 13 with the screw shaft 3A interposed therebetween is released.

In addition, as shown in FIG. 3, upon completion of the mold closing, when the screw shaft 3A integrally moves with the second pulley 43 by a predetermined distance in the mold opening direction and reaches the predetermined retreat position, the joining surface 5AS of the second pulley 43 is joined to the joining surface 5BS of the transmission shaft 7A, the transmission shaft 7A and the screw shaft 3A are linked, and the connection between the second driving device 7 and the movable platen 13 with the screw shaft 3A interposed therebetween is brought into a connected state.

When the transmission shaft 7A is rotated in a predetermined direction by the second driving device 7 during a period in which the transmission shaft 7A is linked to the screw shaft 3A, rotational power of the transmission shaft 7A is transmitted to the screw shaft 3A by a friction force generated between the joining surface 5AS and the joining surface SBS, the transmission shaft 7A rotates the screw shaft 3A, the movable platen 13 is made to advance, a predetermined clamping force is applied to the mold M, and the clamping of the mold M is performed.

During a period in which the screw shaft 3A is in the predetermined advance position and the joining surface 5BS of the transmission shaft 7A is separated from the joining surface 5AS of the second pulley 43, even if the transmission shaft 7A is rotated by the second driving device 7, rotational power generated by the second driving device 7 is not transmitted to the screw shaft 3A because the power transmission device 5 separates the transmission shaft 7A and the screw shaft 3A and brings the transmission shaft 7A and the screw shaft 3A into an unlinked state.

The power transmission device 5 in the embodiment shown in FIG. 1 is configured to transmit power by the friction force generated between the first rotation plate 5A and the second rotation plate 5B. As long as the joining surface 5AS and the joining surface 5BS can be joined and power can be transmitted therebetween, both the first rotation plate 5A and the second rotation plate 5B are not required to have a plate shape or a circular cross-sectional shape, and the outer shape of both the first rotation plate 5A and the second rotation plate 5B is not limited.

In the embodiment shown in FIG. 2 and FIG. 3, a friction component is arranged on a joining surface on at least one of the first rotation plate 5A and the second rotation plate 5B of the power transmission device 5. For example, as shown in FIG. 2 and FIG. 3, a friction component 50 is arranged on a joining surface at the mold closing direction front-end part of the transmission shaft 7A corresponding to the second rotation plate 5B. More specifically, the friction component 50 is, for example, a brake shoe. By arranging the friction component 50 on the pair of rotation plates of the power transmission device 5, even if rotational power greater than that during the clamping is applied to a joined part of the pair of rotation plates that is the first rotation plate 5A and the second rotation plate 5B, the screw shaft 3A is less likely to idle, and power of the second driving device 7 can be transmitted more reliably.

In addition, instead of the friction component 50, gear-like unevenness may be respectively arranged on the joining surface 5AS and the joining surface 5BS. When the power transmission device 5 is configured to transmit power by meshing of the unevenness between the first rotation plate 5A and the second rotation plate 5B, even if rotational power greater than that during the clamping is applied to a joined part of the pair of rotation plates that is the first rotation plate 5A and the second rotation plate 5B, the screw shaft 3A is less likely to idle, and power of the second driving device 7 can be transmitted more reliably.

The second driving device 7 is a part for applying a clamping force to the movable platen 13. The second driving device 7 applies a predetermined clamping force between the fixed mold FM and the movable mold MM by linking the transmission shaft 7A to the screw shaft 3A with the power transmission device 5 interposed therebetween, rotating the transmission shaft 7A, and rotating the screw shaft 3A.

Specifically, the second driving device 7 shown in FIGS. 1 to 3 includes a bracket 71, a cylinder 72, and a clamping lever 73. The cylinder 72 has a cylinder tube 72A and a piston 72B which is inserted through the cylinder tube 72A in a way of advancing and retreating freely. The cylinder 72 is, for example, a fluid pressure cylinder, and is a pneumatic cylinder (an air cylinder) in the second driving device 7 of the clamping apparatus 1A of the embodiment shown in FIGS. 1 to 5, but may be another cylinder such as an electric cylinder or the like.

Figure 4:
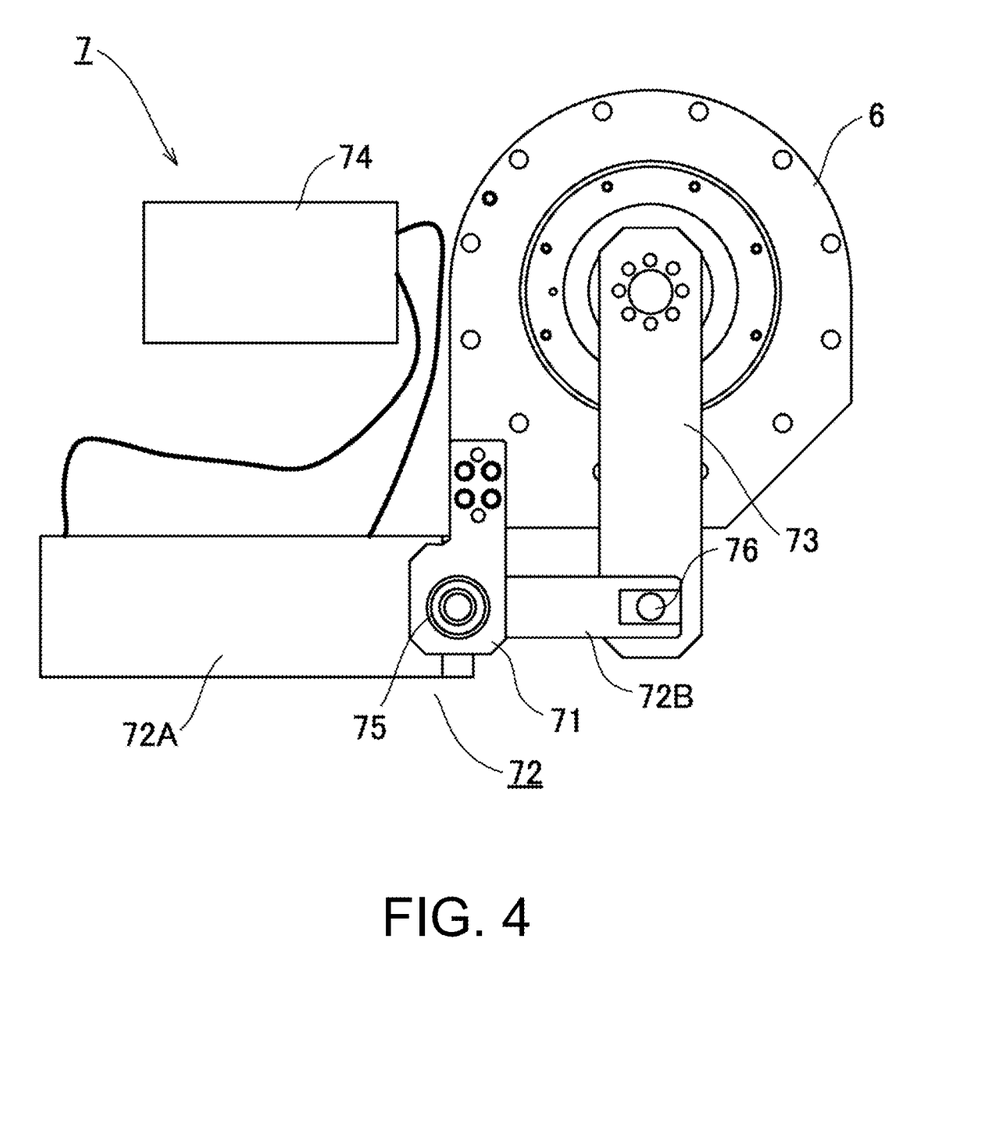
FIG. 4 is a front view of a second driving device according to the first embodiment showing a state before clamping.
Figure 5:
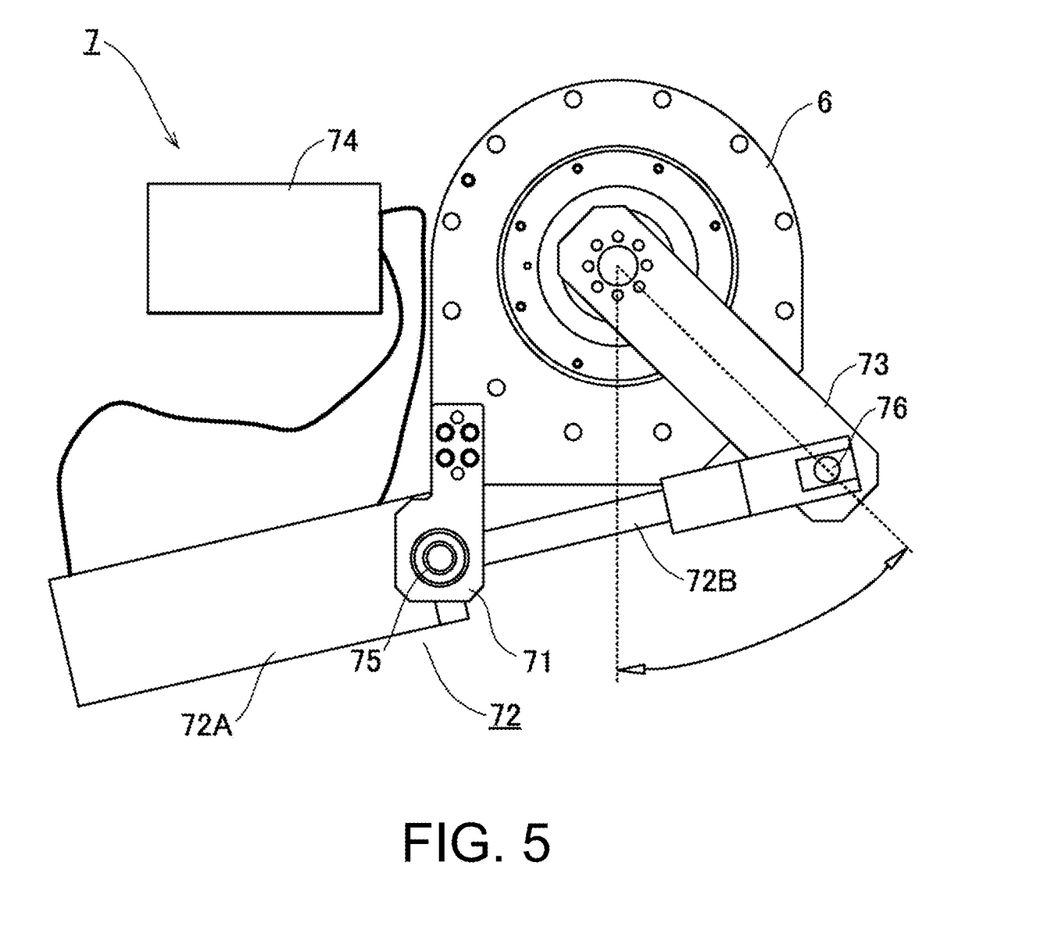
FIG. 5 is a front view of the second driving device according to the first embodiment showing a state during the clamping.

The cylinder tube 72A of the cylinder 72 is connected to a fluid supply source 74 that supplies a fluid. The fluid supply source 74 shown in FIG. 4 and FIG. 5 is a common high-pressure gas supply part, and illustration and detailed descriptions thereof are omitted. The fluid supply source 74 has: an air compressor; a filter for removing dust or the like from a fluid supplied from the air compressor; a regulator for adjusting the pressure of air supplied to the cylinder tube 72A; a plurality of electromagnetic valves for opening/closing a flow path; a quick exhaust valve for exhausting the fluid inside the cylinder tube 72A during the operation of the piston 72B; and respective piping.

The bracket 71 is connected to the case 6 and the cylinder tube 72A, and holds the cylinder 72 on the case 6. One end of the clamping lever 73 is connected to the piston 72B, and the other end of the clamping lever 73 is connected to the transmission shaft 7A. By moving the piston 72B of the cylinder 72 forward and backward, the clamping lever 73 swings, and the transmission shaft 7A rotates in a way of a camshaft. When the screw shaft 3A is in the retreat position, the screw shaft 3A rotates in conjunction with the transmission shaft 7A in the same rotation direction as the transmission shaft 7A, and a desirable clamping force is applied to the mold M.

As shown in FIG. 4 and FIG. 5, with regard to the second driving device 7, preferably, the cylinder tube 72A and the bracket 71 are connected via a shaft 75 in a way of rotating freely, and the piston 72B and the clamping lever 73 are connected via a shaft 76 in a way of rotating freely. By this configuration, a configuration is not required in which a long-hole is formed at a connection part between the piston 72B and the clamping lever 73 and a sliding shaft sliding along the long-hole is arranged. Therefore, greasing for maintaining sliding properties of the connection part between the piston 72B and the clamping lever 73 becomes unnecessary, and grease scattering can be prevented.

Hereinafter, based on FIG. 6, the clamping apparatus 1B according to a second embodiment is described. It should be noted that members equivalent to those of the clamping apparatus 1A in the first embodiment are marked with the same signs, and detailed descriptions are omitted. The first embodiment and the second embodiment are different mainly in the configuration of the second driving device.

The clamping apparatus 1B includes: the bed 11, the fixed platen 12, the movable platen 13, the back platen 14, the tie bar 15, and a driving mechanism 2B. The driving mechanism 2B includes: the ball screw mechanism 3, the first driving device 4, the power transmission device 5, the case 6, and a second driving device 9 including the transmission shaft 7A.

Similar to the second driving device 7 in the first embodiment, the second driving device 9 of the second embodiment rotates the transmission shaft 7A and generates a clamping force to the mold M. The second driving device 9 includes: a motor for clamping 91, a first pulley 92, a second pulley 93, and a rotation transmission component 94.

The motor for clamping 91 is, for example, an induction motor, but may be another actuator such as a fluid pressure motor or the like. A driving shaft 91T of the motor for clamping 91 is directly linked to the first pulley 92, and the second pulley 93 is connected to the transmission shaft 7A. The rotation transmission component 94 is, for example, a timing belt, and is wound around the first pulley 92 and the second pulley 93. Rotational power of the motor for clamping 91 is transmitted to the transmission shaft 7A via the rotation transmission component 94, and when the screw shaft 3A is in the predetermined retreat position, the screw shaft 3A rotates in conjunction with the transmission shaft 7A, and a desirable clamping force is applied to the mold M. Moreover, in addition to the mechanism formed by the pulley and the timing belt, for example, a mechanism formed by a plurality of gears, or a mechanism formed by a chain and a plurality of gears or sprockets can be applied as the rotation transmit mechanism including the rotation transmission component 94.

Next, the operation of the clamping apparatus of an injection molding machine of the disclosure is described. In the following descriptions, a case in which a thermoplastic resin is molded is described as an example, but the clamping apparatus 1A or the clamping apparatus 1B of the claimed disclosure also can be applied to an injection molding machine which uses another material. In addition, a step (an inject cycle) performed by the injection device and a step (a clamping cycle) performed by the clamping apparatus 1A or the clamping apparatus 1B among all of the steps (a molding cycle) can be partially performed in parallel at the same time.

Positioning of the movable platen 13 is performed as setup work before the molding. When the fixed mold FM is attached to the fixed platen 12 and the movable mold MM is attached to the movable platen 13, together with the screw shaft 3A and the second pulley 43 that is the first rotation plate 5A, the housing 3E is moved by the urging mechanism 8 by a predetermined distance approximately corresponding to the small gap G in the mold opening direction, and the joining between the first rotation plate 5A and the second rotation plate 5B is separated in the power transmission device 5.

In order to perform the positioning of the movable platen 13 in a state in which the connection between the second driving device 7 (the second driving device 9) and the movable platen 13 is released, in the clamping apparatus 1A (the clamping apparatus 1B), a control device (not shown) operates the motor for mold opening/closing 41 of the first driving device 4 to make the movable platen 13 advance at a low speed. Besides, a position of the movable platen 13 when the fixed mold FM and the movable mold MM come into contact is stored as a "mold contact position" in a storage device of the control device. Moreover, in the first embodiment and the second embodiment, a relative position of the movable platen 13 in the linear single-axis direction along the mold opening/closing direction is indirectly detected by a rotary encoder (not shown) arranged in the motor for mold opening/closing 41, but for example, the position of the movable platen 13 can be directly detected by a linear scale.

When the movable platen 13 continues to be made to advance from the mold contact position, the movable platen 13 does not move any longer and the mold closing is completed. When the mold closing is completed, the movable platen 13 retreats by the predetermined distance corresponding to the small gap G in the mold opening direction because the mold reaction force caused by the mold M is generated on the movable platen 13, and thereby the screw shaft 3A and the first rotation plate 5A move in the same mold opening direction by the same predetermined short distance as the movable platen 13, and the joining surface 5AS of the second pulley 43 which is the first rotation plate 5A and the joining surface 5BS on the mold closing direction front-end part 7C of the transmission shaft 7A which is the second rotation plate 5B are joined. The position at this time is stored in the storage device of the control device as a "connection completion position" in which the first rotation plate 5A and the second rotation plate 5B are joined and the connection between the second driving device 7 (the second driving device 9) and the movable platen 13 is in a connected state in the power transmission device 5.

As a result of the joining between the first rotation plate 5A and the second rotation plate 5B, the transmission shaft 7A is linked to the screw shaft 3A, and the connection between the second driving device 7 (the second driving device 9) and the movable platen 13 comes into a connected state. In the first embodiment and the second embodiment, it is designed that the transmission shaft 7A is substantively directly linked to the screw shaft 3A, and the screw shaft 3A completes one rotation for each rotation of the transmission shaft 7A.

The control device operates the cylinder 72 of the second driving device 7 or the motor for clamping 91 of the second driving device 9, and pushes the movable mold MM in the mold closing direction until the movable platen 13 does not move any longer, and the clamping of the mold M is completed. When the molding cycle is started after the clamping completion, the control device performs plastication and metering of the molding material in the injection device.

After the setup work is completed, the control device operates the clamping apparatus 1A or the clamping apparatus 1B to start the clamping cycle. At the start of clamping cycle, as at the start of the setup, while the flange 3F integrated with the housing 3E is pressed against the inner wall 6A of the case 6 by the urging mechanism 8, the screw shaft 3A and the second pulley 43 which is the first rotation plate 5A moves by a predetermined short distance in the mold closing direction, and the joining between the first rotation plate 5A and the second rotation plate 5B is released in the power transmission device 5.

Firstly, the control device rotates the motor for mold opening/closing 41 to relatively move the movable platen 13 at a high speed to approach the fixed platen 12 in the mold closing direction along the mold opening/closing direction until the movable platen 13 reaches the mold contact position stored in the storage device of the control device. Then, the speed is rapidly reduced immediately before the movable mold MM and the fixed mold FM come into contact in the mold contact position, the contact is performed in a state where the movable platen 13 is at a low speed, and the mold closing is completed.

When the mold closing is completed, a force in a reverse direction which exceeds the urging force exerted by the urging mechanism 8 pressing the housing 3E against the case 6 in the mold closing direction, in other words, a mold reaction force is generated in the mold opening direction. As the movable platen 13 is pushed back and slightly retreats along the mold opening/closing direction due to the mold reaction force, the screw shaft 3A linked to the movable platen 13 moves by a predetermined short distance in the mold opening direction, and the second pulley 43 of the first driving device 4 which is the first rotation plate 5A of the power transmission device 5 also moves in the mold opening direction integrally with the screw shaft 3A. Then, when the screw shaft moves by a predetermined distance approximately the same as the predetermined small gap G, the first rotation plate 5A is joined to the second rotation plate 5B.

At this time, the bearing 3C pivotally supporting the screw shaft 3A moves in the mold opening direction together with the screw shaft 3A due to the mold reaction force which exceeds the urging force of the urging mechanism 8, and thus the housing 3E that holds and stores the bearing 3C moves by the same predetermined distance in the mold opening direction integrally with the flange 3F. Thus, at this time, the flange 3F crushes the elastic body 8B that is a compression spring by a force having the same magnitude as the mold reaction force which exceeds the urging force of the urging mechanism 8, and the elastic body 8B contracts.

When the small gap G between the second pulley 43 which is the first rotation plate 5A and the mold closing direction front-end part 7C of the transmission shaft 7A which is the second rotation plate 5B is filled and the transmission shaft 7A and the screw shaft 3A are linked, the second driving device 7 (the second driving device 9) operates to rotate and drive the screw shaft 3A through the transmission shaft 7A, and thereby the movable platen 13 is strongly pushed in the clamping direction and the clamping is performed. Moreover, in the first embodiment and the second embodiment, when the rotary encoder arranged in the motor for mold opening/closing 41 detects the connection completion position stored in the storage device of the control device, the control device determines that the transmission shaft 7A and the screw shaft 3A are linked.

In the first embodiment, as shown in FIG. 4 and FIG. 5, by making the piston 72B of the cylinder 72 advance, the clamping lever 73 swings and the transmission shaft 7A is rotated around the central axis. When the movable platen 13 receives the mold reaction force and the screw shaft 3A is in the predetermined retreat position, as shown in FIG. 3, the first rotation plate 5A and the second rotation plate 5B are joined and the transmission shaft 7A and the screw shaft 3A are linked, and thus when the transmission shaft 7A rotates around the central axis, the screw shaft 3A rotates in the same rotation direction at the same rotation speed, and a desirable clamping force is applied to the mold M. Moreover, the desirable clamping force can be generated by arbitrarily setting a driving force of the cylinder 72 and a swing angle of the clamping lever 73. In the first embodiment, because the cylinder 72 is a pneumatic cylinder, the clamping force is adjusted by the set pressure of the regulator and the swing angle of the clamping lever 73.

In the second embodiment, the rotational power of the motor for clamping 91 is transmitted to the second pulley 93 from the first pulley 92 through the rotation transmission component 94 to rotate the second pulley 93, and thereby the transmission shaft 7A rotates around the central axis. When the movable platen 13 receives the mold reaction force and the screw shaft 3A is in the predetermined retreat position, the first rotation plate 5A and the second rotation plate 5B are joined and the transmission shaft 7A and the screw shaft 3A are linked, and thus when the transmission shaft 7A rotates around the central axis, the screw shaft 3A rotates in the same rotation direction at the same rotation speed, and the desirable clamping force is applied to the mold M.

Moreover, in the first embodiment and the second embodiment, the first driving device 4 can be configured so that the first driving device 4 is constantly connected to the movable platen 13 with the screw shaft 3A interposed therebetween, thus leaving the motor for mold opening/closing 41 to be driven for a while after the clamping force is applied to the mold M by the second driving device 7 (the second driving device 9). By this configuration, it is possible to more reliably prevent the mold M from unexpectedly opening during the transition from the mold closing to the clamping. Particularly, the clamping can be performed more safely and reliably by leaving the motor for mold opening/closing 41 to be driven until the clamping is completed and making the first driving device 4 work with the second driving device 7 (the second driving device 9) to apply the clamping force to the mold M.

For example, in the first embodiment, the motor for mold opening/closing 41 is driven until the position of the piston 72B reaches a predetermined position which is previously determined in design and the swing angle of the clamping lever 73 reaches a predetermined value, or until a fluid pressure supplied to the cylinder 72 by the fluid supply source 74 reaches a prescribed value which is previously determined. The motor for mold opening/closing 41 is stopped after the position of the piston 72B and the swing angle of the clamping lever 73 reach the prescribed value or after the air pressure inside the cylinder 72 reaches the prescribed value.

In addition, for example, in the second embodiment, the motor for mold opening/closing 41 is driven at the same time in a period until an output torque of the motor for clamping 91 reaches a prescribed torque value which is previously determined, and the motor for mold opening/closing 41 is stopped after the output torque of the motor for clamping 91 reaches the prescribed torque value.

In a state in which the desirable clamping force is applied to the mold M, the injection device injects the molding material into a cavity space of the mold M, and pressure holding is continued. The mold M is kept at a predetermined temperature by a temperature adjustment device (not shown), the molding material injected into the cavity space is cooled and solidified, and a molded product having a desirable shape is formed.

After the cooling, the clamping force of the mold M is eliminated and the pressure is released. In the first embodiment, firstly, while the clamping force is generated on the mold M by the second driving device 7 (the second driving device 9), the motor for mold opening/closing 41 is started up, the screw shaft 3A is rotated in the mold closing direction, and the mold is made closed. After a detection position of the rotary encoder arranged in the motor for mold opening/closing 41 reaches the connection completion position of the movable platen 13 stored in the storage device of the control device, the piston 72B of the cylinder 72 of the second driving device 7 is made to retreat and the clamping lever 73 is returned to an initial position. Moreover, the initial position of the clamping lever 73 is detected by a limit switch (not shown) arranged in the cylinder 72.

In addition, similarly in the second embodiment, while the clamping force is generated on the mold M by the second driving device 9, the motor for mold opening/closing 41 is started up, the screw shaft 3A is rotated in the mold closing direction, and the mold is made closed. After the detection position of the rotary encoder arranged in the motor for mold opening/closing 41 reaches the connection completion position of the movable platen 13, the motor for clamping 91 is stopped. In the above way, pressure release is performed on the clamping force. In this way, by driving the motor for mold opening/closing 41 to close the mold and then releasing the clamping force to perform pressure release of the mold, the possibility can be eliminated in which the mold M unexpectedly opens at a high speed due to the urging mechanism 8, and damages to the molded product or the mold M can be prevented.

After the pressure release is finished, the control device drives the motor for mold opening/closing 41, separates the movable platen 13 from the fixed platen 12, and performs the mold opening of the fixed mold FM and the movable mold MM. The contact state of the fixed mold FM and the movable mold MM is released by the mold opening, and thus the mold reaction force is lost. Therefore, the elastic body 8B which is a compression spring of the urging mechanism 8 is restored and stretches. Thus, the flange 3F moves along the mold opening/closing direction toward the mold closing direction due to the urging force of the compression spring, and the housing 3E is again pressed against the inner wall 6A of the case 6.

When the housing 3E moves in the mold closing direction by a predetermined short distance approximately corresponding to the small gap G, the bearing 3C accommodated in the housing 3E also moves in the mold closing direction by the predetermined distance. The screw shaft 3A pivotally supported by the bearing 3C and the second pulley 43 of the first driving device 4 that is the first rotation plate 5A which is fixed to a mold opening side front-end of the screw shaft 3A advance together, and thereby the predetermined small gap G is generated between the screw shaft 3A and the transmission shaft 7A and the connection of the power transmission device 5 is released. After the mold M is sufficiently opened, the molded product is separated and removed from the mold M.

Then, a series of clamping cycles which have been described are repeated until a predetermined number of molded products are obtained. According to the clamping apparatus 1A or the clamping apparatus 1B of the embodiments described above, switching of power between the mold opening/closing driving portion and the clamping driving portion can be performed in a shorter time, and furthermore, the time required for the molding can be shortened.

Several examples have already been shown, but the disclosure is not limited to the same configurations as in the specific embodiments, and the embodiments can be implemented in a way of performing appropriate variations, replacements with other components, and combinations without departing from the technical ideas of the disclosure.

What is claimed is:

1. A clamping apparatus of an injection molding machine, comprising:
    a first driving device, configured to operate a movable platen to which a movable mold is attached and fixed to perfolin a mold opening/closing;
    a second driving device, configured to apply a clamping force to the movable platen;
    a screw mechanism, configured to convert a rotational power of the first driving device or the second driving device into a linear power, so that the movable platen reciprocates along a mold opening/closing direction;
    a power transmission device, configured to transmit a power of the first driving device to the screw mechanism, and switch a transmission of a power from the second driving device to the screw mechanism by contact/separation between a first rotation plate coupled to a screw shaft of the screw mechanism and a second rotation plate disposed facing the first rotation plate in an axis direction of the screw shaft; and
    an urging mechanism, configured to:
        integrally move the screw shaft and the first rotation plate in a mold closing direction, separate a joining between the first rotation plate and the second rotation plate wherein a gap is formed between the first rotation plate and the second rotation plate, and release a connection of the second driving device at a normal time, and
        allow the screw shaft and the first rotation plate to integrally move in a mold opening direction due to a mold reaction force generated between a pair of molds, and bring the connection of the second driving device into a connected state when a mold closing is completed, wherein the gap is eliminated, and the first rotation plate and the second rotation plate are joined.

2. The clamping apparatus of an injection molding machine according to claim 1, further comprising:
    a case, configured to accommodate, as well as the urging mechanism, the first rotation plate and a housing of a bearing that pivotally supports the screw shaft,
    wherein the urging mechanism is configured to integrally move the screw shaft and the first rotation plate to a predetermined advance position in the mold closing direction at the normal time by urging the housing to be pressed against an inner wall of the case in the mold closing direction integrally with the screw shaft, the first rotation plate, and the bearing.

3. The clamping apparatus of an injection molding machine according to claim 1, wherein
    the urging mechanism comprises at least one compression spring.

4. The clamping apparatus of an injection molding machine according to claim 1, wherein
    the first rotation plate is integrally formed with a mold opening direction back-end part of the screw shaft.

5. The clamping apparatus of an injection molding machine according to claim 1, further comprising:
    a nut support body,
    wherein a mold closing direction front-end of the nut support body is fixed to the movable platen, and
    the nut support body is configured to support a nut of the screw mechanism.

6. The clamping apparatus of an injection molding machine according to claim 1, wherein the first driving device comprises:
    a motor for mold opening/closing;
    a first pulley which is coupled to a driving shaft of the motor for mold opening/closing;
    a second pulley which is coupled to the screw shaft; and a rotation transmission component which transmits a rotation of the first pulley to the second pulley.

7. The clamping apparatus of an injection molding machine according to claim 1, wherein
the power transmission device has a configuration in which a power is transmitted by a friction force generated between the first rotation plate and the second rotation plate.

8. The clamping apparatus of an injection molding machine according to claim 1, wherein
the power transmission device has a configuration in which a power is transmitted by an uneven meshing between the first rotation plate and the second rotation plate.

9. The clamping apparatus of an injection molding machine according to claim 2, wherein
the second driving device comprises a transmission shaft which is arranged between a driving source and the second rotation plate of the power transmission device, and
the transmission shaft is configured to transmit a power of the driving source to the second rotation plate as a rotational power.

10. The clamping apparatus of an injection molding machine according to claim 9, wherein
the second rotation plate is integrally formed with a mold closing direction front-end part of the transmission shaft.

11. The clamping apparatus of an injection molding machine according to claim 9, wherein the second driving device comprises:
a cylinder having a cylinder tube and a piston which is inserted through the cylinder tube in a way of advancing and retreating freely; and
a clamping lever in which one end is connected to the piston and the other end is connected to the transmission shaft.

12. The clamping apparatus of an injection molding machine according to claim 11, wherein
the second driving device comprises a bracket configured for holding the cylinder on the case, and
the second driving device has a configuration in which the piston and the clamping lever are connected in a way of rotating freely, and the cylinder tube and the bracket are connected in a way of rotating freely.

13. The clamping apparatus of an injection molding machine according to claim 9, wherein the second driving device comprises:
a motor for clamping;
a first pulley which is coupled to a driving shaft of the motor for clamping;
a second pulley which is coupled to the transmission shaft; and
a rotation transmission component which transmits a rotation of the first pulley to the second pulley.

14. The clamping apparatus of an injection molding machine according to claim 5, wherein
the nut support body has a structure in which at least a part on a mold opening direction back-end side is a hollow columnar body, the nut of the screw mechanism is attached and fixed inside the hollow columnar body, and the screw shaft of the screw mechanism is inserted into the hollow columnar body.

15. The clamping apparatus of an injection molding machine according to claim 6, wherein
the second pulley is the first rotation plate.

* * * * *